May 22, 1934. A. F. SPITZGLASS 1,959,742

RECORDING CHART MECHANISM

Original Filed Jan. 10, 1929 2 Sheets-Sheet 1

Inventor
Albert F. Spitzglass
per James B. Lewis
Attorney

May 22, 1934.  A. F. SPITZGLASS  1,959,742
RECORDING CHART MECHANISM
Original Filed Jan. 10, 1929   2 Sheets-Sheet 2

Inventor
Albert F. Spitzglass
per James B. Lewis
Attorney

Patented May 22, 1934

1,959,742

UNITED STATES PATENT OFFICE 1,959,742

RECORDING CHART MECHANISM

Albert F. Spitzglass, Chicago, Ill., assignor to Republic Flow Meters Company, Chicago, Ill., a corporation of Illinois Original application January 10, 1929, Serial No. 331,468. Divided and this application August 2, 1930, Serial No. 472,524

11 Claims. (Cl. 242—55)

The present invention relates to recording instruments, and more particularly to the multiple pen recording type, in which a plurality of instruments are arranged to record fluctuations or variations of forces by styluses on a moving sheet or chart in the form of more or less irregular lines, so that by using a chart divided and ruled according to a predetermined standard visible records are obtained showing exactly the character and extent of such fluctuations.

This is a division of the applicant's copending application Serial No. 331,468 filed Jan. 10, 1929, particularly with reference to Figs. 4 and 6 to 11 inclusive thereof.

In recording instruments of the strip chart type, employing, as a record sheet, a strip of paper normally fed from a roll, supported in rear of and usually below the feed roll, considerable difficulty has been encountered in replacing and inspecting the rolls because of the inaccessible position of the roll supporting mechanism.

Considerable difficulty has also been encountered in providing a feed roll for the chart which can be adapted to charts of different widths and which will operate successfully with charts the width of which vary because of climatic conditions in different localities.

It is a fundamental object of the present invention to provide improved feed roll and chart roll supporting mechanisms which will be positive and reliable in operation, and which will give the maximum range of usefulness.

Another object is to provide a longitudinally adjustable feed roll.

Still another object is to provide a new and improved feed roll or drum and driving connection therefor.

Yet another object is to provide a new and improved chart roll support.

An additional object is to provide a chart roll support which may be moved forward to an accessible position whereby the roll may be easily inspected or renewed.

With these and other objects in view, the invention consists in the construction and novel combination and arrangement of parts hereinafter fully described, illustrated in the accompanying drawings and pointed out in the claims hereto appended, it being understood that various changes in the form, proportion and details of construction, within the scope of the claims, may be resorted to without departing from the spirit or sacrificing any of the advantages of the invention.

In the drawings, wherein like reference characters designate like parts throughout the several views—

Figures 1, 2, 3:
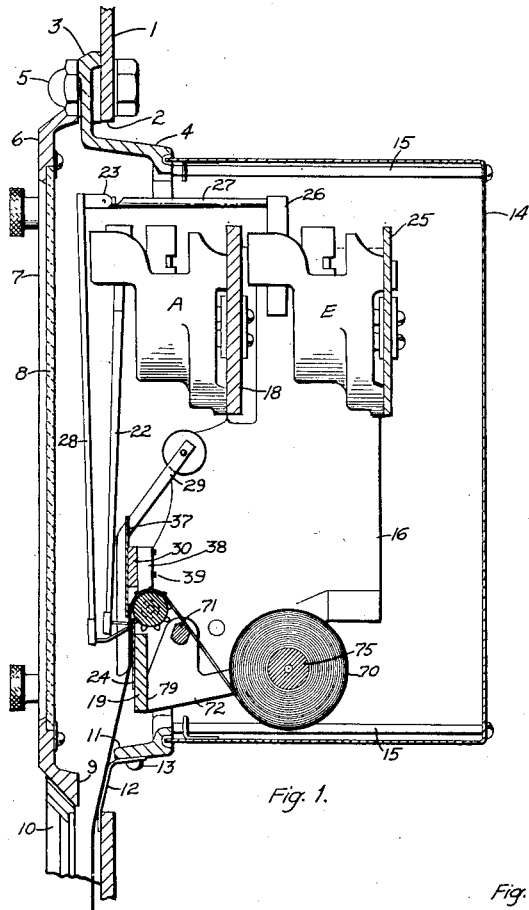
Fig. 1 represents a vertical sectional view through the recorder and adjacent sections of the panel and chart guide.
Fig. 2 is a detail in perspective showing the feed roll, the guides therefor, and the friction clutch by which the worm wheel drives said roll.
Fig. 3 is a perspective view of one of the end members showing the method of mounting the feed roll, the driving connection therefor and the clock.

Referring more specifically to the exemplary embodiment of the invention illustrated in the drawings, the numeral 1 designates a panel board or mounting for the recorder provided with an opening for the reception of a portion of the recorder casing which consists of a bezel portion 3 of such width as to subtend the opening 2 and lie against the front face of the panel and a wall portion 4 projecting backwardly therefrom with a part thereof passing through the opening in the panel. Bezel 3 is adapted to be rigidly secured to the panel by securing means, such as bolts 5, and when so secured thereto forms a substantially flush front assembly with the front of the panel. A door 6 closes the front of the recorder casing and this door is provided with a window 7 closed by a transparent medium such as a glass 8 through which the recorder mechanism and the records made thereby on the chart may be inspected. The bottom portion of the door is preferably cut away as at 9 to provide a space for the free passage of the chart as it passes from the recorder casing into the guide 10.

Referring to Fig. 1, it will be seen that the portion of the recorder casing adjacent the path of the record strip is cut away at 11 to permit a substantially vertical drop of the record strip from the feed roll to the guide. This is an important feature since it dispenses with the bending of the record strip as it moves away from the feed roll and it also causes the strip to travel in a path parallel to and in close proximity to the panel board and away from the glass window of the guide. In this arrangement the front surface of the strip does not come in contact with any object after it leaves the recorder stylus thus allowing the ink to dry without smearing, which would inevitably occur if the strip rubs against any object before the ink has time to dry, and a clean clear cut record is thus preserved. A metal strip 12, secured to casing 4 as by means of screws 13, serves to close the opening in the casing and to direct the strip into the guide. The rear open end of the recorder casing is adapted to be closed by a cover 14 retained in position by bolts 15 which conveniently engage threaded openings in the wall portion 4 of the casing.

The mechanism mounting frame comprises end castings or numbers 16 and 17 connected together by the mounting plate 18 and the end tie member 19. As shown, in Fig. 4, the end castings 16 and 17 are counter-sunk at 20 for the reception of the mounting plate 18 and member 19 which are securely held in position as by screws 21. The frame assembly illustrated forms a rigid structure which is adapted by reason of the hinge connection, through hinge lugs 22 cooperating with lugs on the casing 4, to swing back and forth like a door when the cover 14 is removed. In the normal operating condition of the apparatus, the frame is rigidly held in place by suitable means cooperating with the free end thereof and the casing 4.

The motor units, one of which is represented by A, constituting the front bank or row are mounted on the plate 18 by suitable means such as screws not shown. Each of these units is provided with a pen or stylus 22′ extending to the required position on the chart to make a mark thereon as it passes by said pen. These pens are pivotally connected to their respective operating shafts, as clearly shown at 23, in Fig. 1, so that they can be swung away from the chart for a purpose to be hereinafter described.

The transverse pivots 23 of the pens are so placed with respect to the plane of the strip chart that the center of gravity of the pens lies slightly out of the vertical line passing through the pivot 23 so that there is a small pressure due to gravity of the pens against the chart. A plate 24, carried by member 19, is placed behind the chart to serve as a backing member for the chart and against which the pens press the chart.

The end casting 16 is provided, preferably at its rear edge, for the reception of one end of a second mounting plate 25, which is spaced away from the front plate 18, to provide sufficient space therebetween to accommodate another set of units, one of which is clearly shown as E in Fig. 1, the other end of plate 25 is conveniently supported by suitable means from the end casting 17. The units of the back row are structurally the same as those of the front row and are suitably supported from the plate 25 with the axes thereof in alignment with the axis of the corresponding units of the front row. In order to carry the motion of the back row of units forward to the pens a lever 26, secured to the pen operating shaft of each unit, is provided which carries an arm 27 to the forward end of which the pen 28 is pivotally connected as at 23. The pens of the back row overhang the corresponding pens of the front row so that the front and back pens working on the same chart section can pass without interfering with each other. In order to distinguish the records of the front and back units different colored ink is used.

Where three pens or a multiple thereof are used the chart is preferably divided into three paths and a pen or group of pens mark only on one path, thus a pen of the front row and a pen of the back row operate over one of the paths while corresponding pairs of pens of the front and back rows operate over each of the other two paths, thus there are three separate paths and no crossing of inks. Where more than one pen operates over a single path records are chosen which are not liable to cross, for example, different temperatures along a boiler, all of which are greater than the one preceding. When this is done as many as six or nine records can be made on a single chart without the terrible confusion that that number would ordinarily give.

The principle and mode of operation of the foregoing briefly described arrangements are set forth in full in the description in the copending application Serial No. 331,468, referred to hereinbefore and needs no further description.

Figure 4:
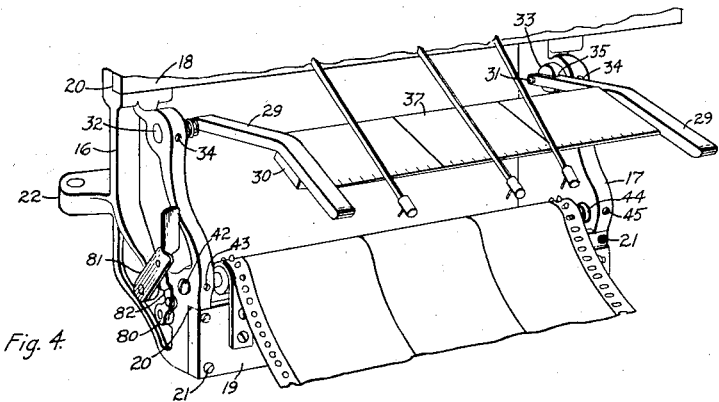
Fig. 4 is a view showing the pen lifter in raised position.

As illustrated in Fig. 4, the pen lifter consists of end pieces 29 and a connecting member 30 which is rigidly secured to said pieces to form therewith a sturdy construction. The overall length of the pen lifter is such that it is freely received between the end castings 16 and 17. End pieces 29 are each provided with an opening 31 for the reception of a bearing pin 32, 33 carried by castings 16 and 17, respectively, and the bearing pins are retained in position in the castings by screws 34. By loosening the screws 34 the bearings and pen lifter can be readily removed and/or replaced. One of the bearings, here shown as 33, is preferably provided with a slot 35 adapted to receive the adjacent edge of end piece 29, when said piece is in raised position. Interposed between the other end piece 29 and its adjacent casting is a spring 36 which yieldingly urges the pen lifter toward the bearing provided with the slot and the arrangement is such that when the pen lifter is raised, to its upper position, the spring causes the end piece to snap into the slot and retains said lifter in that position.

While the structure just described forms a very satisfactory latch mechanism it is to be understood that other forms of latch means may be utilized. One such form suggests itself, namely, an opening could be formed in the bearing or end casting adjacent thereto so that a pin carried by the end piece would snap thereinto when the pen lifter is raised to its uppermost position.

To lower the pen lifter, to its normal position, it is pressed against the spring until the end piece is free of the slot then it swings easily into the position shown in Fig. 1. One object of the pen lifter is to move the pens away from the chart and retain them in that position so that a new chart roll may be inserted. It also may be necessary to retain the pens away from the chart for other purposes and the structure just described provides an expedient method of accomplishing that result.

The dial plate 37 mounted on the pen lifter carries graduations and legends designating what the different units are measuring. Blocks 38, preferably secured by means of screws 39, to the back of member 30 of the pen lifter, as shown in Fig. 1, serve to keep the chart in engagement with the feed roll as it passes thereover. These blocks are conveniently placed near the ends of the member so that they will contact with the chart near the longitudinal edges thereof when the pen lifter is in its lowermost position, and thereby keep the sprocket teeth of the feed roll in engagement with the perforations of the chart to insure proper advancement of the chart. The lower part of end pieces 29, to which back member 30 is secured, are so formed that they lie in a plane substantially parallel with the plane of the face of end tie member 19, when the pen lifter is in its lower position and the ends of said pieces extend beyond the lower edge of member 30, as shown in Fig. 1, to serve as guides for the chart during the time the record is being made thereon by the pens. When the pen lifter is in its lower position the lower edge of the dial plate is slightly above and to the front of the top edge of back plate 24 so that it directs the chart in front of said back plate and causes the chart to lie flat against said plate in position to receive the record from the pens. The extensions of the end pieces 29 also hold the lateral edges of the chart against the back plate during the recording operation and direct the chart downwardly into the guide after it has received the record. These are very important features since they insure a perfectly flat surface of the chart for the recording pens to operate upon and a clear accurate record is thereby assured. The pen lifter therefore has another important object to perform that is, to hold the chart against the backing plate during the recording operation and to direct the chart, after it has received the record, into the guide.

The drum or feed roll 40, as shown in Fig. 2, is advantageously provided with sprocket teeth 41 entering previously formed perforations in the record strip to insure a definite relation between the rotative movement of the feed roll and the advancement of the record strip. The ends of the roll are suitably mounted in the end castings, the end of the roll away from the driving motor therefore being supported by a pin bearing 42, more clearly shown in Fig. 4, retained in end casting 16 by means of a screw 43, is supported by bearing 44 retained in end casting 17 by the set screw 45, also clearly shown in Fig. 4. Ofttimes it is desirable to vary the distance between the sprocket teeth 41 to accommodate strip charts of varying widths and to accomplish this end the length of the feed roll is made adjustable by means of the following construction. The end 46 of the feed roll is of reduced diameter and fitting thereon is the sprocket 47 which may be adjusted to different positions longitudinally of the feed roll to increase or decrease, as the case may be, the distance between the sprocket teeth. To prevent relative rotary movement between the feed roll and sprocket 47 and to insure proper alignment of the sprocket teeth so that they will engage the perforations in the record strip the feed roll is provided with a tongue 48 for engagement in a groove 49 of the sprocket when the two are in assembled position and the tongue and groove are slightly off center of the longitudinal axis of the feed roll so that the sprocket can be assembled in only one position and that is the correct position. These are very important features since they provide for a variable length feed roll and insure proper positioning of the parts when the feed roll is assembled. Another important feature which lends itself readily to ease of assembly is the coupling through which the motion is transmitted to the feed roll and which includes the following features. The end of the reduced portion 46 of the feed roll is provided with fingers 50 which interlock with similarly shaped fingers 51 on the end of the shaft 52 which is supported in bearing 44, and the end of portion 46 is bored at 53 for the reception of a bearing pin 54 carried by the end of shaft 52. Pin 54 supports the feed roll when the roll is in assembled position and the end of shaft 52, upon which fingers 51 are formed, is slightly less in diameter than the bearing 44 so that the shaft 52 can be withdrawn through end casting 17 when the set screw 45 is loosened.

By loosening screw 45 and pulling bearing 44 out of its hole and by loosening screw 43 the drum can be removed without in any way interfering with any of the other parts of the instrument. This lends to ease in assembly and also to inspection and servicing.

Shaft 52 extends beyond bearing 44 and has an abutment such as collar 55 secured thereon and against which a friction member, shown as a lock washer 56, is adapted to press. Rotatably mounted on the shaft 52 is a worm wheel 57 which as shown is preferably provided with a hub 58 for engagement with the other side of the lock washer and the worm wheel is held tightly against the washer by the knurled knob 59 rigidly secured to the end of the shaft and which also serves as a convenient means for turning the feed roll by hand as is sometimes necessary when setting the chart for time. The exemplary mechanism just described provides a convenient, inexpensive and readily assembled friction clutch for transmitting motion to the drum, but other forms of friction clutches may obviously be used in lieu thereof. Normally the motion of the worm wheel 57 is transmitted to the feed roll by the friction between the worm wheel, lock washer and the collar and while the friction between said elements is great enough to transmit the motion it is not so great as to preclude the turning of the feed roll by hand as described above.

Figure 5:
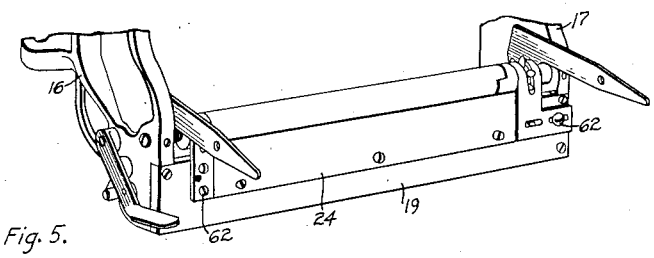
Fig. 5 is a view showing the chart roll support in the forward position.

As shown in Fig. 5, the feed roll 40 is retained in position by the sprocket teeth guiding elements 60 and 61, carried by the frame and preferably secured to tie member 19 by screws 62. The feed roll is of reduced diameter on each side of the sprocket teeth as shown in Fig. 2, and the guide elements 60 and 61 are furcated to straddle the sprocket teeth and the furcated portions are curved on the same radius as the circumference of the feed roll so that the outer portions thereof are flush with the periphery of the feed roll to provide a smooth surface over which the record strip passes. To provide for the adjustment of the distance between the sprocket teeth the guide 61 is provided with elongated slots 63 and 64 and a pin 65 preferably carried by member 19 is adapted to be received in one of said slots, here shown as 63, and the other slot 64 receives the screw 62. By loosening the screw 62 the member 61 can be adjusted to different positions along the axis of the feed roll and this adjustment also moves the sprocket 47 thereby varying the position of said sprocket relative to the remaining portion of the feed roll and the sprocket is maintained in adjusted position by tightening said screw 62. This adjustable feature provides a convenient means whereby the feed roll can be adapted to charts of different widths and to charts the width of which vary because of climatic conditions in different localities.

The record sheet or chart is provided with suitably spaced openings formed adjacent the lateral edges thereof for cooperation with the sprocket teeth to insure advancement of the chart and the openings of one row are elongated to allow for lateral expansion and contraction of the chart due to changes in humidity and temperature. The adjustable feature provides a means whereby the length of the feed roll may be adjusted to a chart for a particular locality or season and the elongated slots take care of the day by day changes in the width of the chart incident to variations in humidity and temperature. These features are extremely important and have the decided advantage in that there is no strain of any kind put on the chart as it is fed over the roll.

The feed roll may be operated in any suitable manner and is preferably driven, through worm wheel 57 and worm 66, by means of a clock mechanism 67, shown as an electric clock, although it might be substituted by a spring driven clock, supported on the end casting 17. A suitable support 68 being shown as cast integral with the end casting 17 although other means may be availed of to support the clock from the casting. When the clock is electrically driven suitable current may be supplied, for driving the clock, through leads 69. Since the structural details of the clock form no part of the present invention and since many forms of such clocks are known in the art it is deemed unnecessary to further show or describe the structural details and the mode of operation thereof.

The record surface or paper on which the record is made is in the form of a sheet, a roll 70 of which is supported on a roll support, mounted in the end castings 16 and 17. This roll support comprises a shaft 71 to which are secured the resilient fingers 72 spaced apart a distance sufficient to accommodate the roll 70. The fingers are rigidly secured to the shaft 71 so as to turn therewith and are substantially L shaped with the shorter or base part of the L secured to the shaft 71 for a purpose hereinafter described. Each of the fingers is provided with an opening 73 for the reception of the bearing pins 74 of the spool 75 upon which the roll is wound and the fingers are adapted to be spread apart upon the removal or insertion of a roll as will be readily understood. Shaft 71 is supported in end casting 17 by means of a pin bearing 76 held in said casting and the other end of said shaft is detachably connected to a short shaft 77, by means of a coupling 78, which shaft is rotatably supported in end casting 16. This arrangement is such that the roll support can be readily removed, by retracting the pin bearing 76 and disengaging the coupling. Shaft 71 is preferably so mounted in the end castings that the heels 79 of the fingers abut against the rear of member 19, Fig. 1, and thereby hold the roll support in normal operating position. While this form of mechanism is desirable it can be appreciated that the fingers may be shaped differently and stop pins or other means may be utilized to hold the roll support in operating position.

Figure 6:
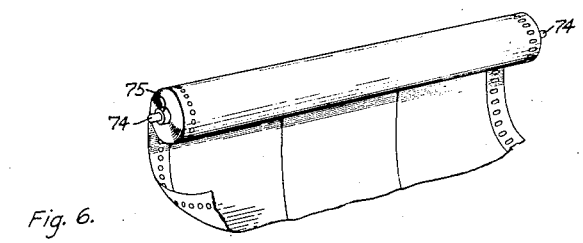
Fig. 6 shows a chart roll such as used in the roll support of Fig. 5.
Figure 7:
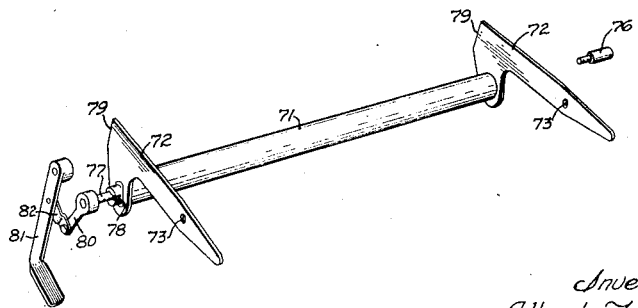
Fig. 7 is a detail in perspective showing the roll support and operating means therefor.

For swinging the roll support to its frontal position a crank 80 is secured to the end of short shaft 77, as shown in Figs. 4, 5 and 7, and a lever 81 is conveniently pivotally mounted on end casting 16 and projects forward to a position for convenient operation. A link 82 pivotally connected at one end to the lever and likewise connected at its other end to the end of the crank serves to transmit the motion of the lever to the crank. The relative lengths of the lever, link and crank are so proportioned that a movement of the lever through about one fourth of a turn or 90 degrees causes the paper roll, supported in the fingers 72, to move upwardly and over through practically one half of a turn or 180 degrees to the position shown in Figs. 5 and 6 where the roll may be conveniently and easily removed and/or replaced without interference with other parts of the device.

When it is desired to replace or inspect the chart roll the pen lifter is raised to the position illustrated in Fig. 4 and the lever 81 pressed downwardly to the position shown in Fig. 5, thus the chart roll is swung over into the position shown in Fig. 5 where it may be conveniently inspected or replaced as the case may be. After the chart roll has been replaced the lever 81 is raised thereby causing the fingers to carry the chart roll to the position shown in Fig. 1, which is its normal position. The pen lifter is then pressed to the left, as viewed from Fig. 4, to free end piece 29 of the slot 35 after which it is lowered to its normal position, conveniently illustrated in Fig. 1, and the device is then ready for operation.

When the front cover 6 and guide 10 are closed and the rear cover 14 is secured in place the recorder mechanism is housed in a substantially dust proof and moisture proof casing which excludes from said mechanism dust, grit, soot and moisture, any of which are harmful to accurate operation of the mechanism. The only opening to the interior of the casing is the opening in the bottom of the guide which is only large enough for the free passage of the chart and since this opening is below the recorder casing the possibility of foreign matter passing upwardly therethrough and through the guide is extremely remote and furthermore the accumulations of foreign matter that do collect in the guide can be conveniently removed when the guide is opened thereby further removing the possibility of such matter ever reaching the recording mechanism.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means and that in some cases certain features of my invention may be used to advantage without a corresponding use of other features.

I do not intend to be limited to the precise details shown and described.

What I claim is:—

1. In a recording instrument, the combination with a feed drum, of movable means for supporting a roll of chart to be fed to the drum, said means normally supporting said roll in rear of the drum and to swing said roll forwardly and over said drum to permit of removing or inserting the roll and when swung back to normal position to position the chart on the feed drum.

2. In a strip chart recording instrument, a frame, a rock shaft rotatably supported in said frame, chart supporting means carried by said shaft and adapted to support a roll of paper in operative position, a crank carried by said shaft, a lever pivotally supported on said frame, and a link interconnected between said crank and lever and the ratio being such that when the lever is moved one fourth of a turn the shaft will complete one half of turn to swing the roll of paper to an accessible position to permit of removing or inserting the roll.

3. In a strip chart recorder, a frame comprising end members and an instrument mounting plate connecting said members, a feed roll supported in said frame, a chart roll supporting mechanism rotatably carried by said frame and adapted to support the chart roll in operative position in rear of the feed roll, and means to rotate said mechanism to carry said chart roll forwardly over said feed roll to permit of inserting or removing the chart roll.

4. In a strip chart recording instrument, a frame, a feed roll supported in said frame, a chart roll supporting mechanism rotatably carried by said frame and adapted to support the chart roll in operative position to the rear and below the feed roll, and means to rotate said mechanism to carry said chart roll upwardly and forwardly over said feed roll to permit of removing or inserting the chart roll.

5. In a graphic recording instrument, a frame, a feed roll rotatably mounted in said frame and provided with sprockets to insure advancement of the recording surface, one of said sprockets being rigid with said feed roll and the other being adjustable longitudinally of said roll but non-rotatable relative thereto and means attached to said frame for holding said latter sprocket in adjusted position.

6. In a strip chart recorder, a frame, a feed roll rotatably mounted in said frame and provided with sprockets to advance the recording strip, one of said sprockets being rigid with said roll and the other being adjustable longitudinally thereof, means for preventing rotary movement of said latter sprocket relative to said roll, and a guide member attached to said frame for retaining said sprocket in adjusted position.

7. In a strip chart recording instrument a feed roll provided with a chart advancing sprocket at one end and having the other end reduced in diameter and one side of the roll cut-away adjacent said reduced portion a second sprocket bored to fit over said reduced portion and having a finger for cooperation with the cut-away portion of the roll to prevent relative rotation between said sprocket and roll.

8. In a graphic recording instrument a frame including end members, a feed roll having a reduced bearing portion, means for rotatably supporting said roll, said means including a bearing mounted in one end member for supporting one end of the roll and a bearing supported in the other end member and a detachable coupling in the reduced portion of the roll, whereby when the first named bearing is released the roll can be readily removed.

9. In a recording mechanism, a frame, a feed roll rotatably mounted in said frame and provided with a chart advancing sprocket rigidly attached to one end and having the other end reduced in diameter, the second chart advancing sprocket mounted at the reduced end so as to permit of longitudinal adjustment with respect to the first sprocket, an adjustable guide member fastened to the frame and cooperating with the sprocket so as to retain the latter sprocket at an adjusted longitudinal relation with the first sprocket.

10. In combination with an adjustable chart feed sprocket mechanism, a guide member for performing said adjustment and for assisting in stripping the chart away from said feed sprocket.

11. In combination with a feed roll having a fixed and an adjustable sprocket for advancing a chart, and a member located in a recessed section of the adjustable sprocket, said member cooperating with the feed roll to effect the desired adjustment between the fixed and movable sprockets and also to strip the chart away from said feed roll.

ALBERT F. SPITZGLASS.